US006684328B2

(12) United States Patent
Matsuura

(10) Patent No.: US 6,684,328 B2
(45) Date of Patent: Jan. 27, 2004

(54) METHOD AND APPARATUS FOR DETERMINING COMPATIBILITY OF COMPUTER PROGRAMS

(75) Inventor: Yoko Matsuura, Tokyo (JP)

(73) Assignee: Sony Corporation (JP)

( * ) Notice: Subject to any disclaimer, the term of this patent is extended or adjusted under 35 U.S.C. 154(b) by 117 days.

(21) Appl. No.: 10/039,149

(22) Filed: Jan. 4, 2002

(65) Prior Publication Data

US 2002/0059480 A1 May 16, 2002

Related U.S. Application Data

(62) Division of application No. 09/212,369, filed on Dec. 15, 1998, now Pat. No. 6,412,082.

(30) Foreign Application Priority Data

Dec. 17, 1997 (JP) .......................................... P09-347601
Dec. 17, 1997 (JP) .......................................... P09-347602

(51) Int. Cl.$^7$ .............................................. G06F 9/455
(52) U.S. Cl. ........................ 713/100; 710/104; 712/225; 709/232; 709/315
(58) Field of Search ...................... 713/1, 100; 709/201, 709/231, 232, 246, 330, 310, 315, 312, 106, 220, 221, 222; 710/20, 101, 10, 74, 73, 8, 104; 712/225

(56) References Cited

U.S. PATENT DOCUMENTS

| 4,538,184 | A | | 8/1985 | Otsuka et al. ............... 358/283 |
|---|---|---|---|---|
| 4,686,621 | A | | 8/1987 | Keeley et al. ............... 364/200 |
| 5,432,935 | A | * | 7/1995 | Kato et al. .................... 395/700 |
| 5,473,775 | A | | 12/1995 | Sakai et al. .................. 395/700 |
| 5,493,671 | A | * | 2/1996 | Pitt et al. ..................... 395/700 |
| 5,522,076 | A | | 5/1996 | Dewa et al. ................. 395/700 |
| 5,548,745 | A | * | 8/1996 | Egan et al. .................. 395/500 |
| 5,594,903 | A | | 1/1997 | Bunnell et al. ............... 717/11 |
| 5,982,399 | A | * | 11/1999 | Scully et al. ................. 345/522 |
| 6,088,747 | A | * | 7/2000 | Cotugno et al. ............... 710/74 |
| 6,141,697 | A | * | 10/2000 | Hale et al. ................... 709/312 |
| 6,192,419 | B1 | * | 2/2001 | Aditham et al. ............. 709/315 |
| 6,209,127 | B1 | | 3/2001 | Mori et al. .................... 717/11 |
| 6,230,117 | B1 | * | 5/2001 | Lymer et al. .................. 703/22 |
| 6,272,521 | B1 | * | 8/2001 | Jablonski et al. ............ 709/200 |
| 6,488,585 | B1 | * | 12/2002 | Wells et al. ................... 463/43 |
| 6,493,768 | B1 | * | 12/2002 | Boutcher ..................... 709/330 |
| 6,519,767 | B1 | * | 2/2003 | Carter et al. ................ 717/140 |

* cited by examiner

Primary Examiner—Jeffrey Gaffin
Assistant Examiner—Rijue Mai
(74) Attorney, Agent, or Firm—Lerner, David, Littenberg, Krumholz & Mentlik, LLP

(57) ABSTRACT

An information processing apparatus performs predetermined processing by executing a computer program. A program memory stores two boot addresses #1 and #2, each of which serves as an address from which a basic program including a boot program for performing a booting operation is stored. In installing a basic program, the boot addresses #1 and #2 are alternately selected to store the basic program. In starting an apparatus, an error of the computer program stored in the program memory is detected, and upon detection, one of the boot addresses #1 and #2 is selected, and the basic program stored from the selected address is executed. The version compatibilities of a basic program or an application program are described in the basic program or the application program. Upon upgrading the version of the application program, it is determined whether the version of the application program is compatible with the version of the basic program, and vice versa. The application program is then installed based on the result of the determination. With this arrangement, even if the installation of the basic program has failed, the apparatus can be started properly. It is also possible to prevent the installation of an application program whose version is incompatible with the OS and to prevent the installation of an OS whose version is incompatible with the application program.

7 Claims, 14 Drawing Sheets

BROADCAST SYSTEM

METHOD AND APPARATUS FOR DETERMINING COMPATIBILITY OF COMPUTER PROGRAMS

CROSS REFERENCE TO RELATED APPLICATIONS

This application is a divisional of application Ser. No. 09/212,369 filed Dec. 15, 1998 now U.S. Pat. No. 6,412,082, the disclosure of which is hereby incorporated by reference herein.

BACKGROUND OF THE INVENTION

The present invention generally relates to information processing apparatuses, information processing methods, and media for providing a computer program. More particularly, the invention relates to an information processing apparatus and an information processing method suitably used in, for example, downloading and installing a computer program. The invention also pertains to a medium for providing a computer program.

When a computer is powered on, it executes a computer for starting the computer (hereinafter sometimes referred to as a "boot program"), which is stored at a predetermined address, thereby running, for example, an operation system (OS). The computer is then ready to run various application programs under the control of the OS.

The address at which the boot program is stored, i.e., address first accessed by the computer (more precisely, by the built-in central processing unit (CPU)) will hereinafter be sometimes referred to as the "boot address."

It is sometimes necessary to overwrite computer programs. For example, a broadcast station is required to overwrite a computer program, including a boot program, for controlling an integrated receiver and decoder (IRD) that is used for receiving satellite broadcasts. In this case, the computer program may be transmitted by a transmission medium via satellite or other means or may be recorded on a recording medium, such as a floppy disk, and then delivered.

However, the overwriting of the computer program may fail, for example, due to the user's accidental operation or power failure, and in the worst case, the apparatus cannot be started.

One of the countermeasures taken against the above disadvantage is to provide two or more boot addresses. Then, a new boot program can be stored at a boot address other than the currently used boot address. Such a boot address storing the new boot program is then treated as the latest boot address. In this case, even if the overwriting of the new boot program fails, the previous boot program stored at one of the boot addresses can be executed to start the apparatus.

However, according to the above-described method in which a plurality of boot addresses are provided, a storage medium, such as a non-volatile memory, is required for the latest boot address. In overwriting the boot program, it is also necessary to overwrite the latest boot address stored in the non-volatile memory. If the overwriting of the boot address fails even when the overwriting of the boot program is successful, the apparatus is unfavorably started by the old boot program, or in the worst case, the apparatus is unable to be started.

SUMMARY OF THE INVENTION

Accordingly, in view of the above background, it is an object of the present invention to reliably run an apparatus in a normal condition (properly).

In order to achieve the above object, according to one aspect of the present invention, there is provided an information processing apparatus for providing a second computer program dependent upon a first computer program. The information processing apparatus includes a processor operable to describe in the second computer program a version of the second computer program and a version of the first computer program compatible with the second computer program.

According to another aspect of the present invention, there is provided a method for providing a second computer program dependent upon a first computer program. The method includes describing in the second computer program a version of the second computer program and a version of the first computer program compatible with the second computer program.

According to a further aspect of the present invention, there is provided a medium recorded with a second computer program dependent upon a first computer program. The medium includes in the second computer program a version of the second computer program and a version of the first computer program compatible with the second computer program.

According to yet a further aspect of the present invention, there is provided an information processing apparatus for installing a second computer program dependent upon a first computer program. The information processing apparatus includes a determination unit operable to make a determination of whether a version of the second computer program is compatible with a version of the first computer program, and to make a determination of whether a version of the first computer program is compatible with a version of the second computer program. An installation unit installs the second computer program based on these determinations.

According to a still further aspect of the present invention, there is provided a method for installing a second computer program dependent upon a first computer program. The method includes making a determination of whether a version of the second computer program is compatible with a version of the first computer program, and making a determination of whether a version of the first computer program is compatible with a version of the second computer program; and installing the second computer program based on these determinations.

DETAILED DESCRIPTION

Figure 1:
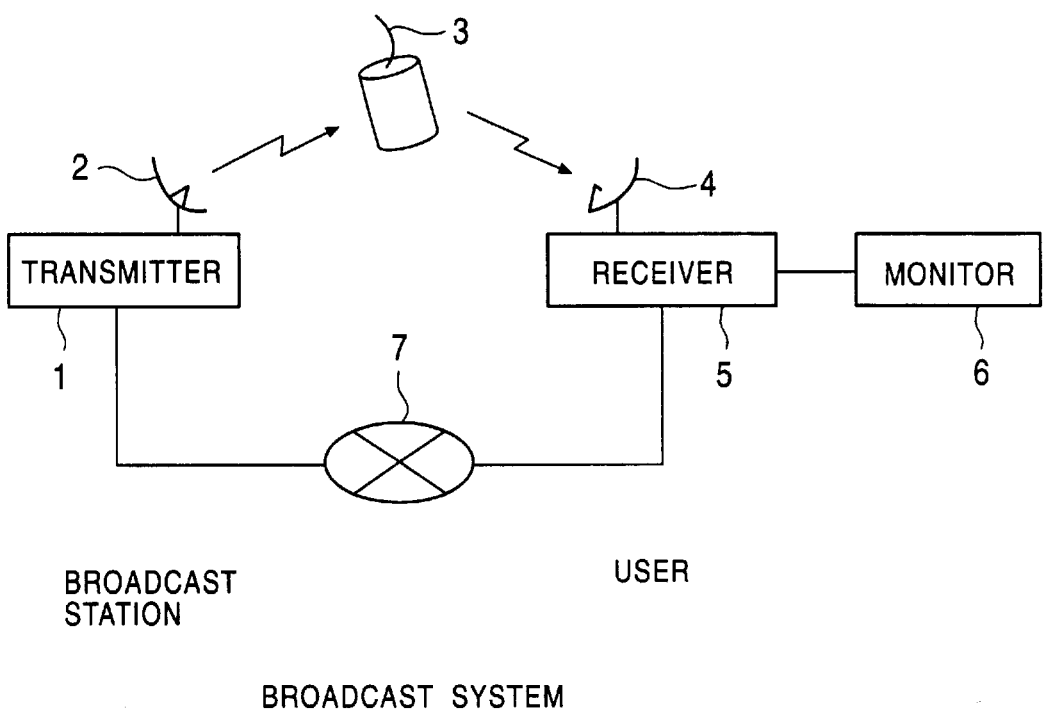
FIG. 1 is a schematic diagram illustrating the configuration of a broadcast system incorporating an embodiment of the present invention.

FIG. 1 illustrates an example of the configuration of a broadcast system incorporating an embodiment of the present invention. In this embodiment, the system is a logically collective form of a plurality of apparatuses, and it is not essential that all the apparatuses be contained in the same housing.

At the broadcasting end, digital video data and digital audio data, both of which serve as a program, are encoded according to, for example, the Moving Picture Experts Group (MPEG) method and scrambled in a transmitter 1. In the transmitter 1, an MPEG transport stream (hereinafter referred to as a "TS") containing digital data as a program and other data is formed, and is modulated according to, for example, the Quadrature Phase Shift Keying (QPSK) method.

The data other than the program data contained in the TS of the transmitter 1 includes a computer program to be run by a receiver 5 at the user end. In the transmitter 1, A TS in which a plurality of programs, for example, six programs are multiplexed is formed in relation to each transponder. For transmitting a computer program, for example, one packet identification (PID) is assigned.

In the transmitter 1, a modulation signal (modulated TS) is up-converted and is transmitted as radio waves via an (parabolic antenna) 2. The radio waves are then received by a satellite 3 and undergo required processing, such as amplification, in a transponder (not shown), and are then transmitted. The radio waves from the satellite 3 are received by an antenna (parabolic antenna) 4 at the user (viewer) end and are further down-converted. The radio waves are then supplied to a receiver 5, such as an IRD.

The receiver 5 first selects one of the signals sent from the antenna 4. More specifically, the satellite 3 generally has a plurality of transponders, and the antenna 4 receives radio waves transmitted from the transponders and down-converts them. Accordingly, the receiver 5 receives signals sent from a plurality of transponders. Among the signals, the receiver 5 selects one signal corresponding to one transponder in accordance with the channel selected by the user.

In the receiver 5, the selected signal, i.e., the QPSK-modulated signal, is QPSK-demodulated to obtain the TS. The TS is further descrambled so as to extract a transport packet (hereinafter sometimes referred to as a "TS packet") corresponding to the channel selected by the user. The data contained in the TS packet is then MPEG-decoded. As a result, the image is supplied to a monitor 6 and is displayed, while the sound is output from a speaker (not shown).

If necessary, the receiver 5 extracts the TS packet containing the computer program, which is then downloaded and installed. In the receiver 5, the installed computer program is then run to perform various processing. This enables the receiver 5 not only to control the individual blocks of the receiver 5, but also to perform the above-described descramble processing, obtain a key required for the descramble processing, and execute accounting processing.

Upon performing descramble processing, the receiver 5 executes accounting processing for viewing the program, i.e., creating a viewing history, as required. The resulting accounting information is transmitted to the transmitter 1 via, for example, a public network 7, and the transmitter 1 then performs accounting based on the received information.

Figure 2:
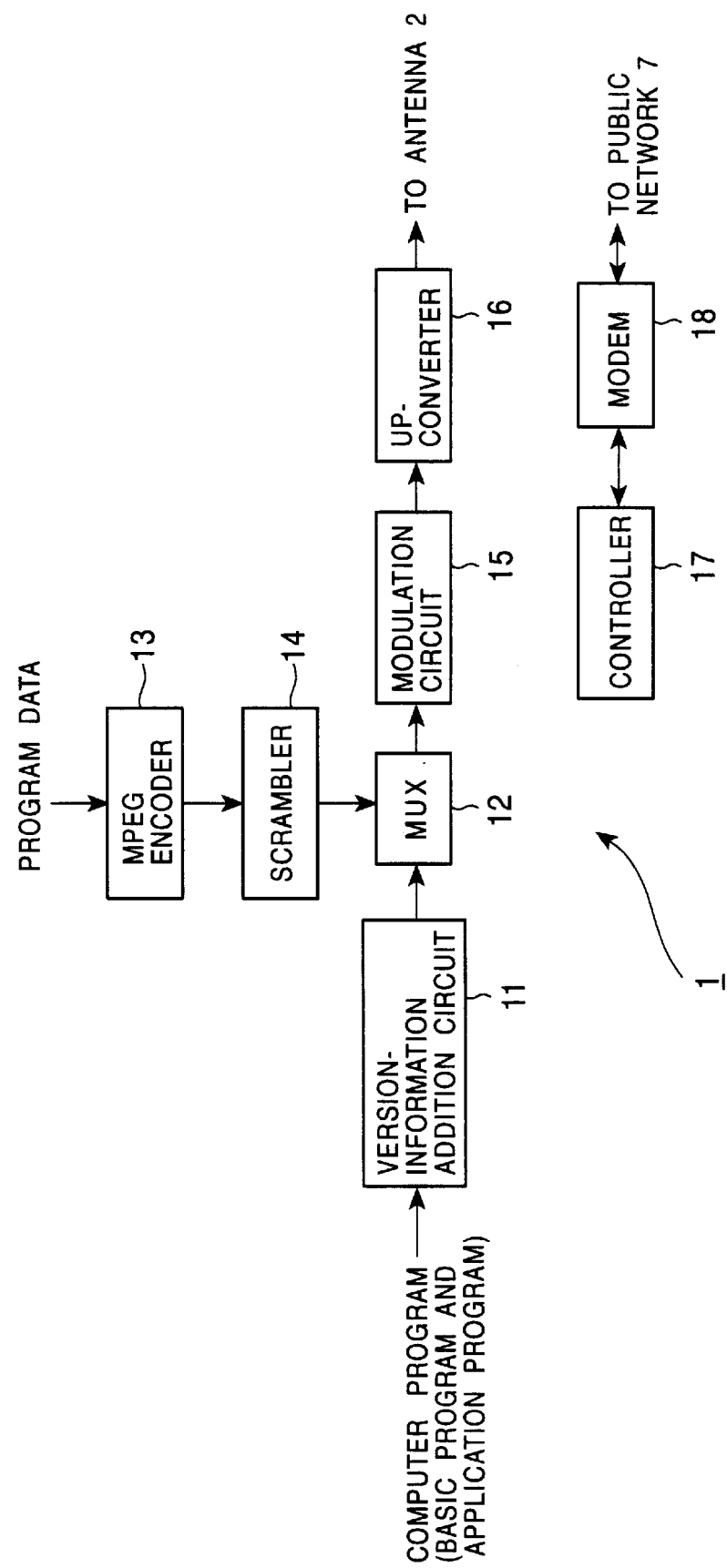
FIG. 2 is a block diagram illustrating the configuration of the transmitter shown in FIG. 1.

FIG. 2 is a block diagram illustrating the configuration of the transmitter 1 shown in FIG. 1.

A version-information addition circuit 11 receives a basic program, which serves as a computer program, and an application program to be distributed to the user. The application program is dependent upon the basic program and is operated under the control of the basic program.

In this embodiment, the basic program is formed of two computer programs, such as a boot portion and a load portion. The boot portion performs the basic control for the computer or the other apparatuses (the receiver 5 in this embodiment), and includes, for example, a boot program, a basic input/output system (BIOS) and an OS. The load portion installs the computer program, and is equivalent to the so-called "installer". The load portion may be included in the application program, in which case, the basic program is formed of only the boot portion.

The version-information addition circuit 11 adds the versions to the basic program and the application program and outputs them to a multiplexer (MUX) 12.

In the MUX 12, an output of the version-information addition circuit 11 and an output of a scrambler 14 are multiplexed to form a TS, which is then supplied to a modulation circuit 15. Input into an MPEG encoder 13 are digital video data and the accompanying digital audio data, both of which serve as a general program. The MPEG encoder 13 then MPEG-encodes the received program data and outputs it to the scrambler 14. The scrambler 14 scrambles an out put of the MPEG encoder 13 as required and then supplies the scrambled data to the MUX 12.

The modulation circuit 15 modulates the TS output from the MUX 12 according to, for example, the QPSK (method, and outputs the modulation signal to an up-converter 16. The up-converter 16 up-converts the modulation signal from the modulation circuit 15 and supplies it to the antenna 2.

A controller 17 not only controls the respective blocks of the transmitter 1, but also executes various processing, such as processing information supplied from a modem 18 and performing accounting processing for viewing the program. The modem 18 receives information, such as accounting information from the receiver 5 via the public network 7 and supplies it to the controller 17.

The operation of the above-constructed transmitter 1 is as follows.

The program data is input into the MPEG encoder 13 so that it is MPEG-encoded and is output to the scrambler 14. The scrambler 15 scrambles the output of the MPEG encoder 13 and supplies it to the MUX 12.

Meanwhile, a basic program and an application program to be distributed to the user are input into the version-information addition circuit 11. In the version-information addition circuit 11, the basic program and the application program are provided with their versions, and are then output to the MUX 12.

In the MUX 12, the output of the version-information addition circuit 11 and the output of the scrambler 14 are multiplexed so as to form a TS. The TS is supplied to the modulation circuit 15 and is QPSK-modulated. The resulting modulation signal is supplied to the antenna 2 via the up-converter 16 and is transmitted as radio waves.

If a demand for establishing a communication link is transmitted from the receiver 5 via the public network 7, the modem 18 receives such a demand to establish the communication link between the transmitter 1 and the receiver 5. This makes it possible to perform data exchange between the transmitter 1 and the receiver 5. More specifically, for example, accounting information transmitted from the receiver 5 is received by the modem 18 and is supplied to the controller 17 of the transmitter 1. The controller 17 is then able to calculate charges for viewing the program based on the accounting information.

Figure 3:
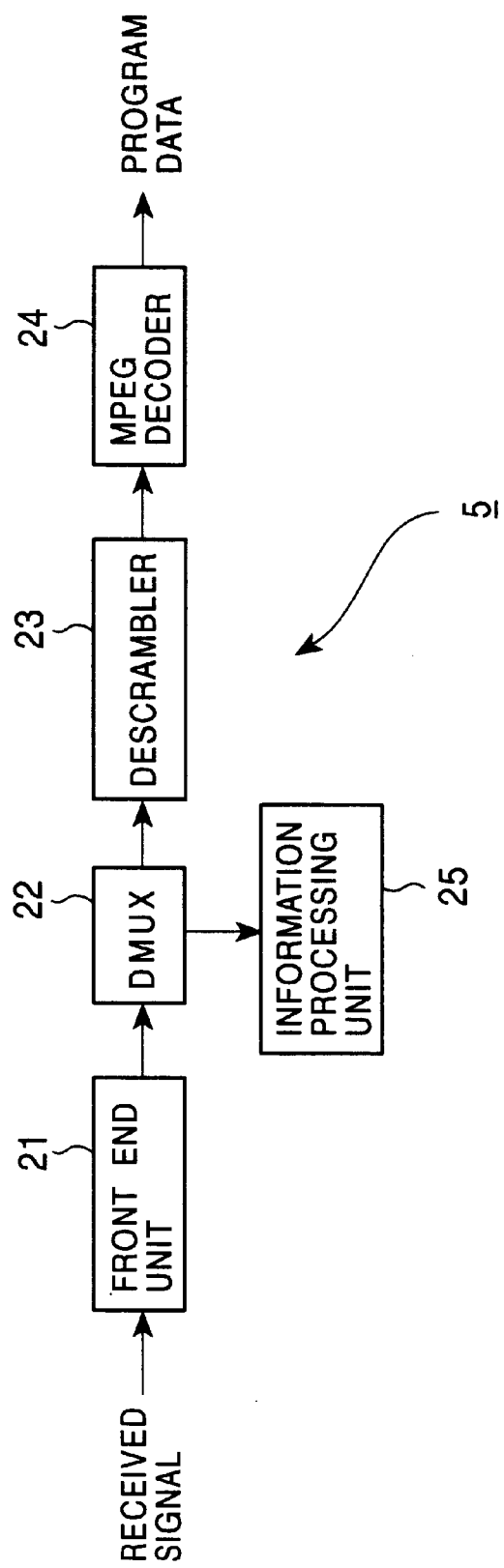
FIG. 3 is a block diagram illustrating the configuration of the receiver shown in FIG. 1.

FIG. 3 is a block diagram illustrating the configuration of the receiver 5 shown in FIG. 1.

The signal received and down-converted by the antenna 4 is supplied to a front end unit 21. The front end unit 21 performed predetermined processing on the received signal to obtain the TS, which is then output to a demultiplexer (DMUX) 22. The DMUX 22 extracts the required TS packet from a plurality of TS packets contained in the TS by referring to the PID. From among the extracted TS packet, the data concerning the general program is supplied to the descrambler 23, while the data concerning the computer program is supplied to an information processing unit 25.

The descrambler 23 descrambles the program data contained in the payload of the TS packet and supplies it to MPEG decoder 24. The MPEG decoder 24 MPEG-decodes the output of the scrambler 23 and outputs the decoded data.

Meanwhile, the information processing unit 25 receives the TS packet from the DMUX 22, and downloads and installs the computer program included in the TS packet. The installed computer program is run so that the information processing unit 25 can control the respective blocks of the receiver 5 and execute various processing.

According to the above-constructed receiver 5, in viewing a general program, the front end unit 21 first receives the signals transmitted via the antenna 4, and selects the signal having a frequency range corresponding to the channel selected through the user's operation of a remote controller (remote commander) (not shown). The selected received signal further undergoes required processing such as QPSK demodulation, to obtain the TS, which is then supplied to the DMUX 22. The DMUX 22 extracts from the TS the TS packet having the PID corresponding to the channel selected by the user, and outputs it to the descrambler 23. The descrambler 23 descrambles the output of the DMUX 22 and outputs it to the MPEG decoder 24, and is then MPEG-decoded. This makes it possible to display images of the program which is broadcast in the channel selected by the user and also to output the corresponding sound of the program.

In the DMUX 22, the TS packet having the PID assigned for distributing the computer program is also extracted from the TS supplied from the front end unit 21. The computer program contained in the VS packet is then output to the information processing unit 25.

The information processing unit 25 controls the respective blocks of the receiver 5 by running the pre-installed computer program. Upon receiving a new computer program from the DMUX 22, the information processing unit 25 installs it. Then, upon resupplying power or resetting the CPU 32, the information processing unit 25 is able to control the respective blocks of the receiver 5 and to perform various processing by running the new computer program.

Figure 4:
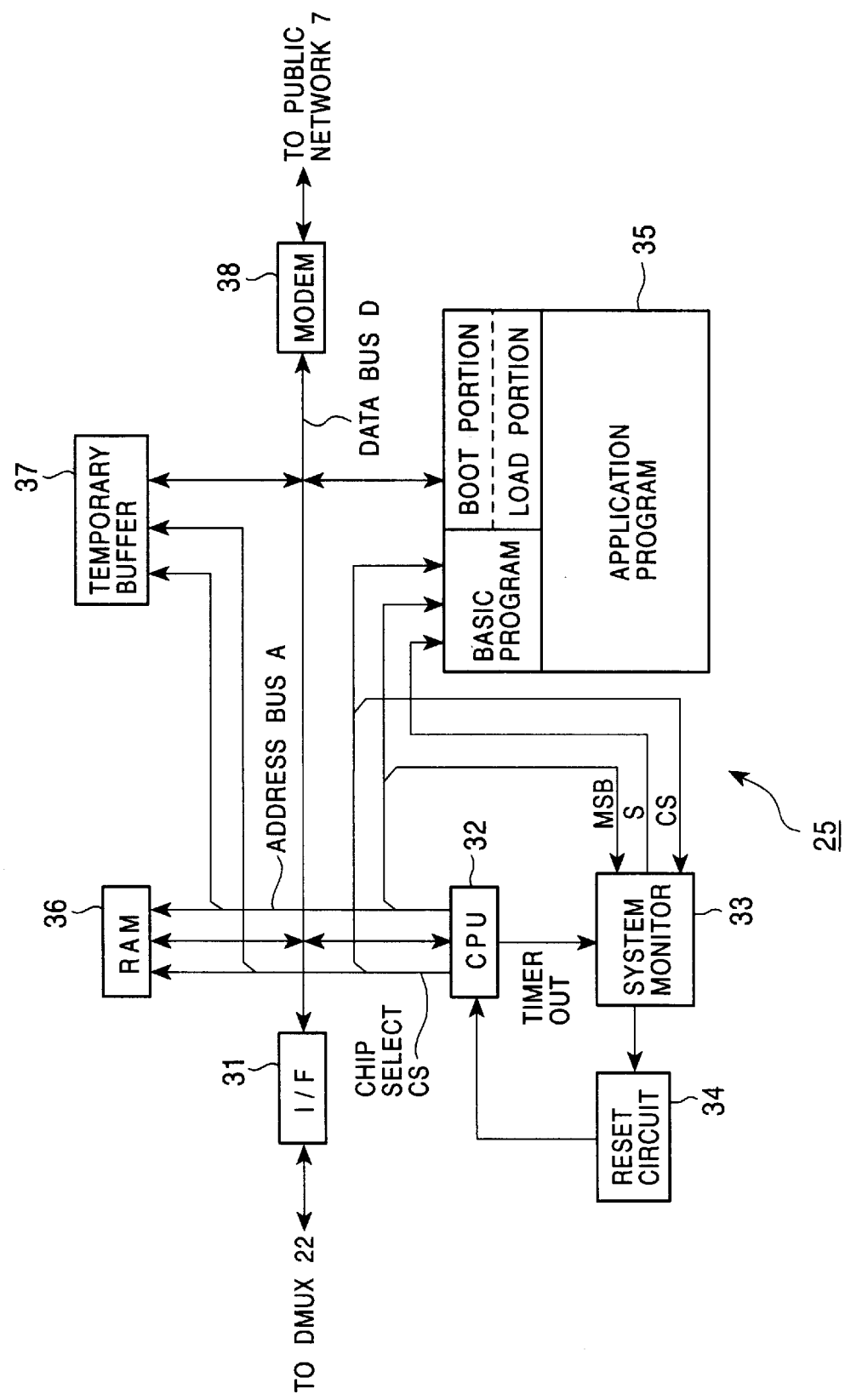
FIG. 4 is a block diagram illustrating the configuration of the information processing unit shown in FIG. 3.

FIG. 4 is a block diagram illustrating the configuration of the information processing unit 25 shown in FIG. 3.

An interface (I/F) 31 receives the TS packet from the DMUX 22 and supplies the computer program contained in the TS packet to a temporary buffer 37. A CPU 32 is able to control the respective blocks of the receiver 5 and to perform various processing by running a computer program stored in a program memory 35.

A system monitor 33 detects an error made by the CPU 32, and based on the detection result, it selects one of the two boot addresses #1 and #2 preset in the program memory 35. Upon restarting the apparatus, the system monitor 33 is able to control such that the computer program can be run from the selected boot address. The system monitor 33 may also instruct a reset circuit 34 to reset the CPU 32 and restart the apparatus. The reset circuit 34 resets the CPU 32 in response to the instruction from the system monitor 33.

Figure 5:
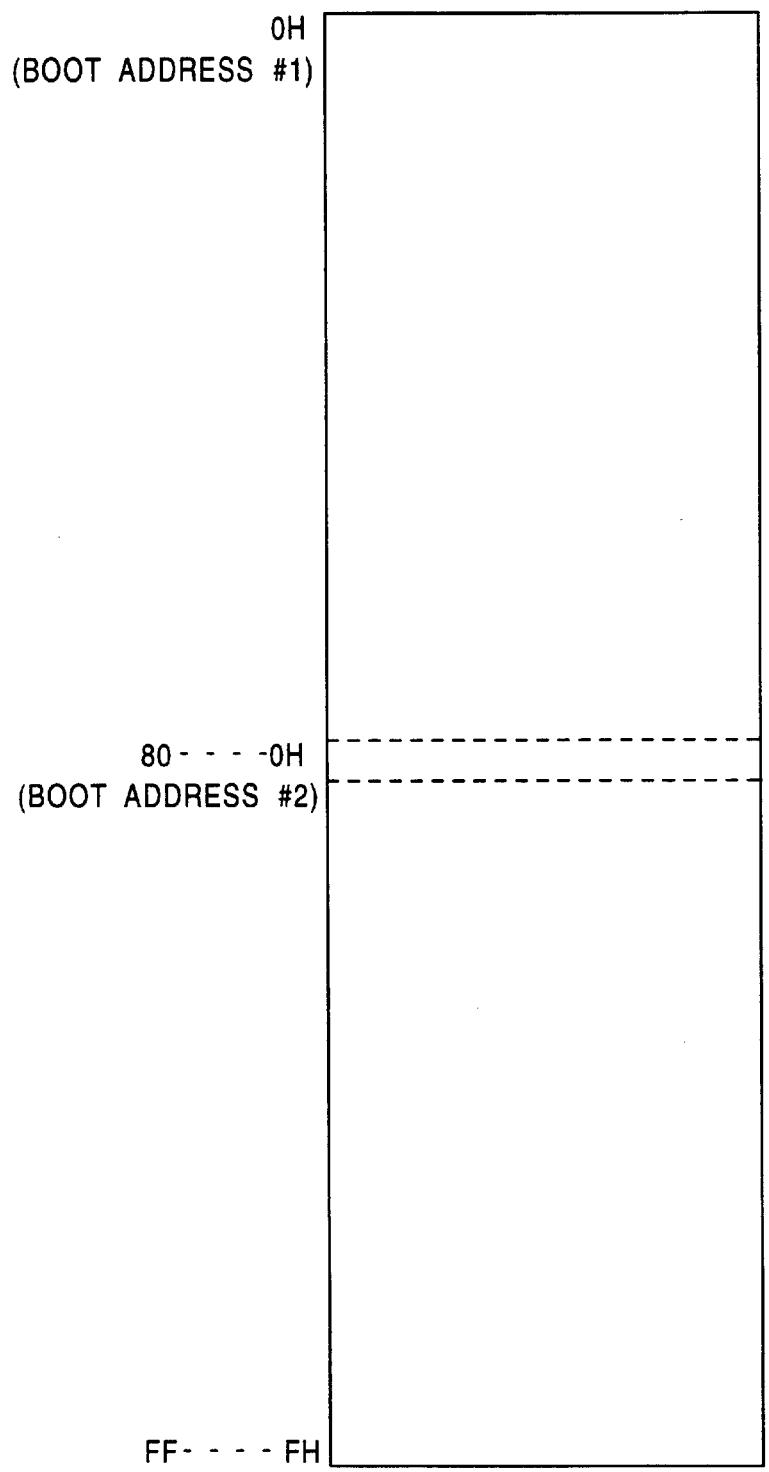
FIG. 5 illustrates a memory map of the program memory shown in FIG. 4.

The program memory 35, which is formed of a non-volatile memory, such as a flash memory, stores a computer program to be run by the CPU 32. The two boot addresses #1 and #2 are set in the computer program 35. More specifically, in this embodiment, as illustrated in FIG. 5, address OH (H represents hexadecimal) is used as the boot address #1, while address 80 . . . OH, at which the address space of the program memory 35 is split into two portions, is used as the boot address #2.

It is now assumed that a certain version of a basic program and an application program operable under the control of the basic program have already been stored (installed) in the program memory 35.

A random access memory (RAM) 36 loads the computer program to be run by the CPU 32 by selecting it from the computer programs stored in the program memory 35. That is, the CPU 32 runs the computer program by reading it from the program memory 35 and writing it into the RAM 36.

Alternatively, the CPU 32 may run the computer program without writing it into the RAM 36. The temporary buffer 37 temporarily stores the computer program supplied via the 1/F 31. A modem 38 controls communications with the transmitter 1 (the modem 18) via the public network 7.

The I/F 31, the CPU 32, the program memory 35, the RAM 36, the temporary buffer 37, and the modem 38 are interconnected to each other via a data bus D through which data exchange can be performed.

The CPU 32 is connected to the program memory 35, the RAM 36, and the temporary buffer 37 via an address bus A, through which the CPU 32 is able to supply the address from/into which the data is read/stored. The CPU 32 also supplies a chip select signal CS to the program memory 35, the RAM 36 and the temporary buffer 37, thereby selecting the chip from/into which the data is read/written.

Among the address bus A, the connecting line from the CPU 32 to the program memory 35 corresponding to the most significant bit (MSB) is connected to the program memory 35 via the system monitor 33. The system monitor 33 processes the MSB of the address from the CPU 32 so as to obtain a selection signal S and transmits the signal S to the program memory 35. As a consequence, the aforementioned boot address can be selected.

The chip select signal CS output from the CPU 32 is also supplied to the system monitor 33. The CPU 32 outputs a timer-out signal having a predetermined cycle to the system monitor 33 during the normal operation. The system monitor 33 determines that the CPU 32 is not under the normal operation (error has occurred) if the chip select signal CS from the CPU 32 turns out to be abnormal or if the timer-out signal is not transmitted.

The operation of the above-constructed information processing unit 25 is as follows.

When the apparatus is powered on, the CPU 32 executes the required portions of the basic program stored in the program memory 35, and further runs the required application program under the control of the basic program. This enables the CPU 32 to control the respective blocks of the receiver 5 and to perform other processing.

As discussed above, a computer program supplied from DMUX 22 is received by the I/F 31 and supplied to and supplied to and stored in temporary buffer 37. Then, the CPU 32 executes the load portion of the basic program stored in the program memory 35, thereby downloading and installing the computer program stored in the temporary buffer 37 (hereinafter sometimes referred to as the "installing operation). It is now assumed that a basic program and an application program, both of which are new versions, are transmitted from the transmitter 1 and are then stored in the temporary buffer 37.

Figure 6:
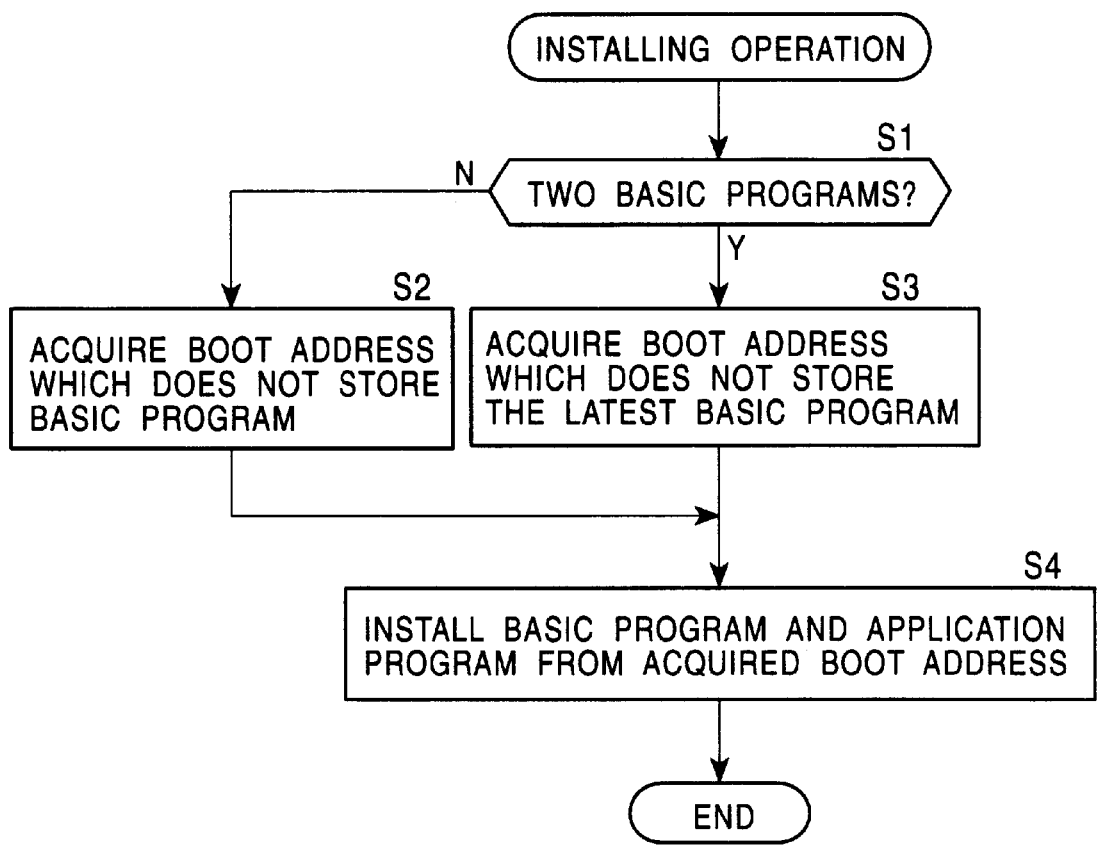
FIG. 6 is a flow chart illustrating the installing operation.

The details of the installing operation are shown in the flow chart of FIG. 6.

In the installing operation, it is first determined in step S1 whether basic programs are stored in both boot addresses #1 and #2 of the program memory 35, i.e., whether there are two basic programs in the program memory 35. If the outcome of step S1 is no, i.e., if it is found that only one of the boot addresses #1 and #2 has a basic program, the process proceeds to step S2 in which the boot address which does not store the basic program is acquired. The process then proceeds to step S4.

Conversely, if the result of step S1 is yes, i.e., if it is found that both boot addresses #1 and #2 store the respective basic programs, the process proceeds to step S3 in which the versions of the two basic programs are compared, thereby identifying the most recent version of the basic program. In step S3, the boot address which does not store the most recent version of the basic program is acquired. The process then proceeds to step S4.

In step S4 the basic program and the application program stored in the temporary buffer 37 are downloaded and stored (installed) in the program memory 35 starting from the boot address acquired in step S2 or S3. The installing operation is thus completed.

According to the aforementioned installing operation, the basic program and the application program stored in the temporary buffer 37 are installed in the program memory 35 in the following manner.

As discussed above with reference to FIG. 5, in this embodiment the boot addresses #1 and #2 are respectively set to be address OH and address 80 . . . OH so as to split the address space of the program memory 35 into two portions.

Figure 7:
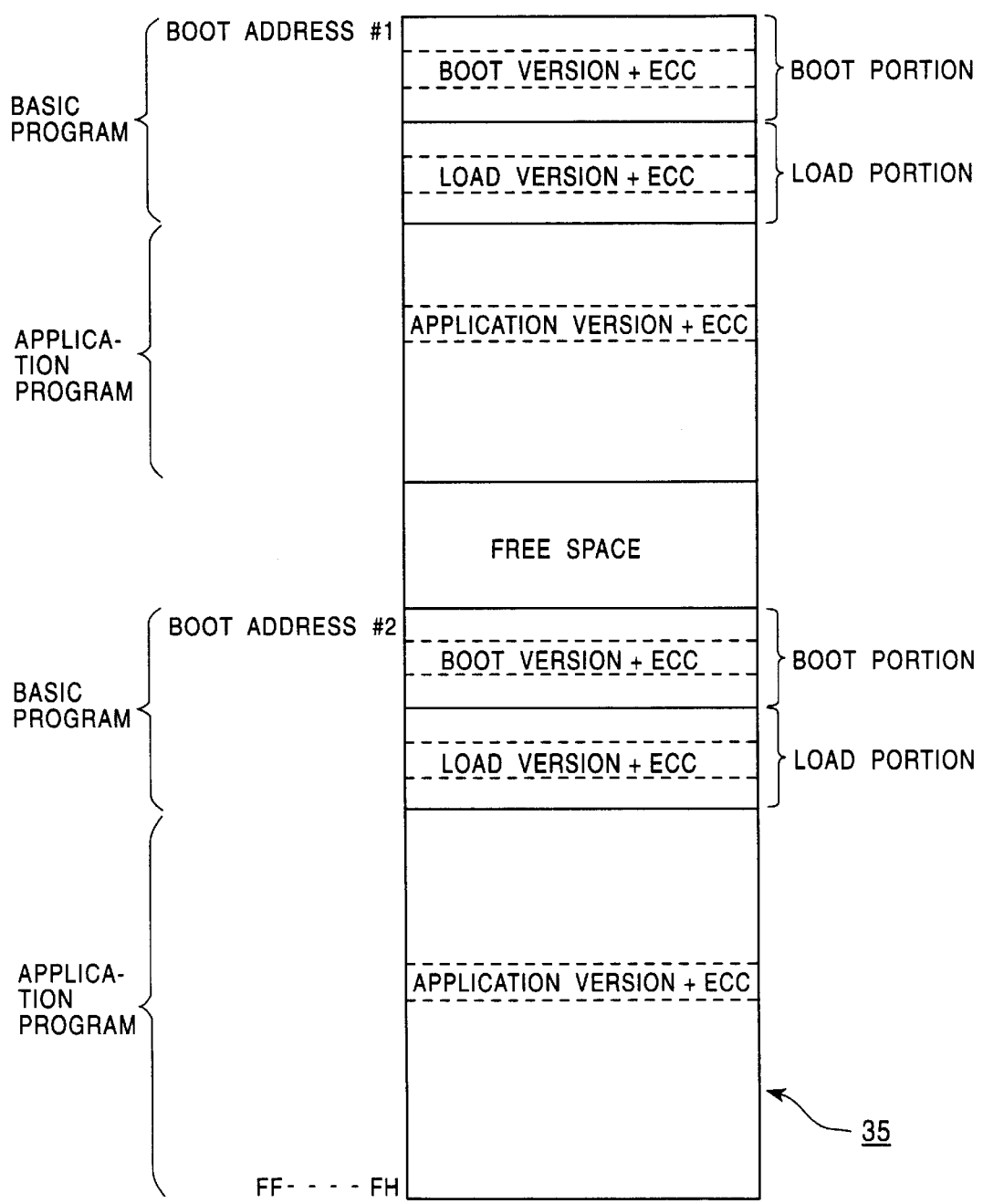
FIG. 7 illustrates the program memory in which two sets of basic programs and application programs are stored.

Accordingly, if the total data amount of basic program and application program stored in the temporary buffer 37 does not exceed one half the capacity of the program memory 35, both basic program and application program are stored, for example, in the state shown in FIG. 7, in each of the boot dresses #1 and #2. In this case, the basic program and the application program stored from one of the boot addresses #1 and #2 are newer (versions) of the two sets of programs stored in the program memory 35 before the installing operation. The basic program and the application program stored from the other boot address #1 or #2 are programs that have been installed according to the above described installing operation.

In the program memory 35 in which two sets of basic programs and application programs are stored, as shown in FIG. 7, the installing operation is conducted as follows. If the versions of the basic program and the application program stored starting from, for example, the address #2, are higher than those stored from the address #1, a new basic program and a new application program are installed and stored from the boot address #1 in which the lower version of the basic program and the application program are stored. That is, the basic program and the application program stored from the boot address #1 are overwritten by the newer ones by the installing operation. As a result, two sets of programs, i.e., the older version of basic program and application program and the newer version of basic program and application program are stored in the program memory 35.

On the other hand, if the total data amount of basic program and application program stored in the temporary buffer 37 exceeds one half the capacity of the program memory 35 (but must not exceed the capacity of the program memory 35), only the most recent version of basic program and application program are installed and stored in the program memory 35.

Figure 8:
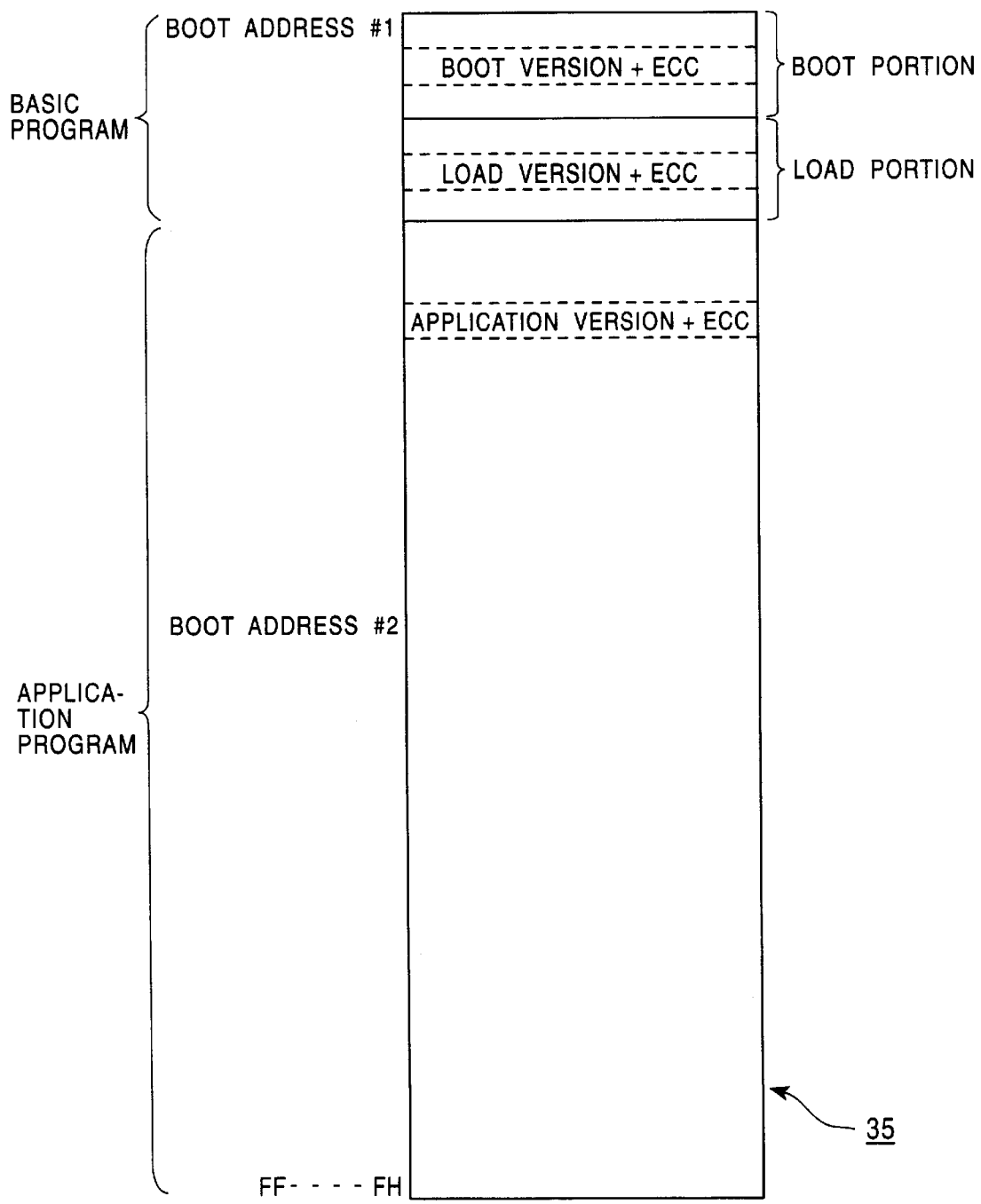
FIG. 8 illustrates the program memory in which a set of basic programs and application programs are stored.

More specifically, in the program memory 35 in which two sets of basic programs and application programs are stored, as shown in FIG. 7, the installing operation is carried out as follows. If the versions of the basic program and the application program stored starting from, for example, the boot address #2, are greater than those stored from the boot address #1, the basic program and the application program having the same amount of data as the capacity program memory 35 are stored in the temporary buffer 37. A new version of basic program and a new version of application program are installed and stored, as shown in FIG. 8, starting from the boot address #1 of the program memory 35 and passes through the boot address #2 up to the final address FF . . . FH. That is, the new basic program and application program overwrite those stored in the program memory 35. As a result, only the most recent version of the basic program and the application program are stored in the program memory 35.

If a new basic program and a new application program having a data amount exceeding one half the capacity of the program memory 35, for example, having the same data amount as the capacity of the program memory 35 are stored in the temporary buffer 37 and are installed into the program memory 35 in the state shown in FIG. 8, they are stored starting from the boot address #2 of the program memory 35. After reaching the final address FF . . . FH, the program returns to the leading address OH and restarts to be stored. That is, in this embodiment, the program memory 35 is configured similarly to a ring buffer.

According to the configuration of the program memory 35 shown in FIG. 7 or 8, it is possible to prevent the apparatus from being disabled by a failure in installing programs.

Figure 9:
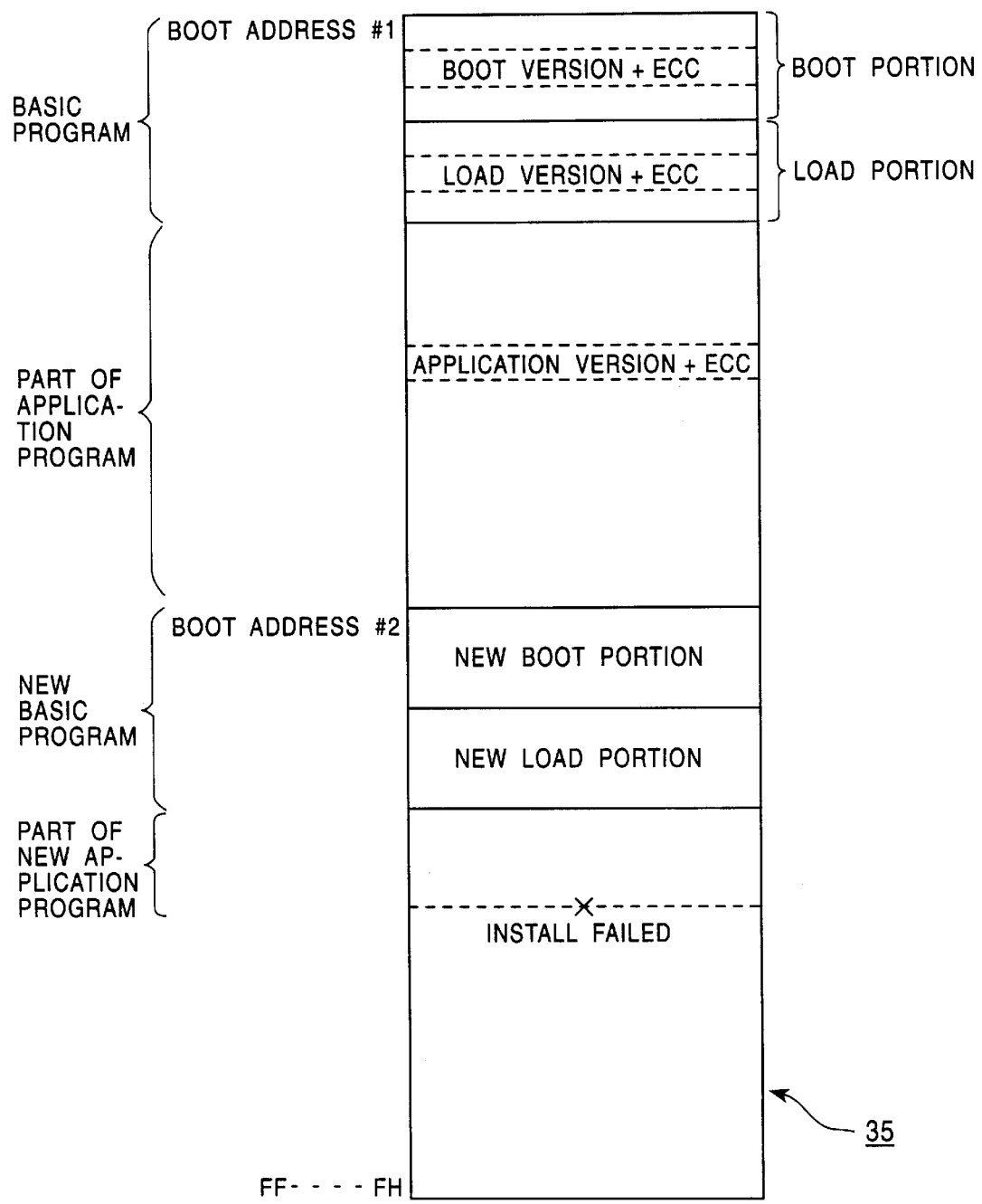
FIG. 9 illustrates the program memory in the state in which the installation has failed.

For example, while a new version of a basic program and a new version of an application program are being installed from the boot address #2, as illustrated in FIG. 7, the installing operation may sometimes fail, as shown in FIG. 9. In FIG. 9, the installation of the new version of basic program has succeeded, while the installation of the new version of application program has failed. This does not, however, present a serious problem since the apparatus can be started by running the new version of basic program.

Figure 10:
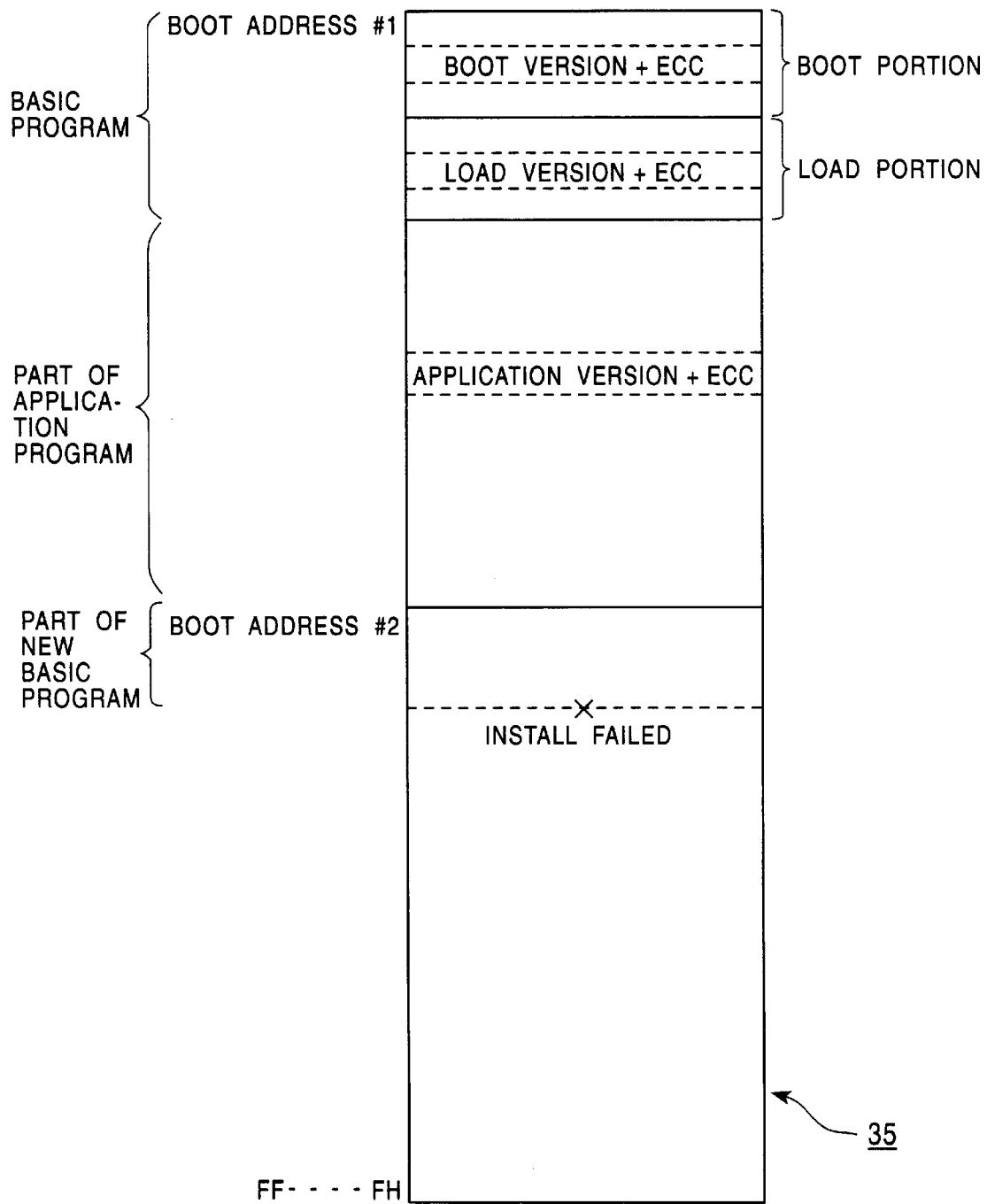
FIG. 10 illustrates the program memory in the state in which the installation has failed.

Alternatively, while a new version of a basic program and a new version of an application program are being installed from the boot address #2, as illustrated in FIG. 7, the installation of the boot portion of the new version of the basic program may sometimes fail, as shown in FIG. 10.

Even in this case, the old version of the basic program is stored in the boot address #1. Accordingly, the old version of the basic program can be run from the boot address #1, thereby making it possible to start the apparatus.

According to the aforementioned configuration of the program memory 35, it is necessary to leave title old basic program in the program memory 35 until the installation of a new basic program (in particular, a boot program) is completed. In order to prevent the old basic program from overwritten, there should be a free space between the boot address #1 and the boot address #2 by an. amount at least equivalent to the data amount of the basic program including the boot program (the data amount of boot program if the boot program is described at the head of the basic program).

According to the foregoing description, the basic program and the application program should be programmed so that the total amount of data does not exceed the capacity of the program memory 35. Simultaneously, in this embodiment, the basic program or the program memory 35 should be programmed or created so that the data amount of the basic program does not exceed one half the capacity of the program memory 35.

After the apparatus is powered on or reset, the CPU 32 shown in FIG. 4 executes the boot portion of the basic program and starts and activates the apparatus (the receiver 5 in this embodiment). The booting operation performed by the information processing unit 25 during the above start-up operation is described below with reference to the flow chart of FIG. 11.

In the booting operation, in step S11, the computer program stored starting from one of the boot addresses #1 and #2 of the program memory 35, for example, the boot address #1, is first run by the CPU 32.

If the boot portion of the basic program is not stored in the boot address #1, or if the basic program related to the processing in Step S11 stored in the boot address #1 contains an error, the CPU 32 is not operating in a normal condition, i.e., the CPU 32 is erroneously operated. A determination of whether the CPU 32 is erroneously operated is made in step S12 in combination with an error check to be Pc formed on the computer program. Error handling performed on the CPU 32 will be described in detail later.

The boot portion contains a code check program for checking the code of the computer program. If a correct boot portion is included in the boot address #1, the code check program is run by the CPU 32 in step S11, thereby checking the code of the basic program stored starting from the boot address #1.

As noted above, in the version-information addition circuit 2 shown in FIG. 2, the versions are added to the basic program, the load portion, and the application program. Additionally, in the version-information addition circuit 2, error correct codes (ECCs) are calculated on information bits presenting the respective programs, and are added to the programs. In steps S11, S13, and S19, the computer program codes are checked based on the respective ECCs.

After completing the check in step S11, the process proceeds to step S12 in which it is checked whether the basic program stored from the boot address #1 contains an error. If the result of step S12 is no, the process proceeds to step S13 in which the code of the basic program stored from the boot address #2 is checked based on the code check program executed by the CPU 32 in step S11.

A determination is then made in step S14 of whether the basic program stored from the boot address #2 contains an error. If the outcome of step S14 is no, i.e., if the basic program stored from the boot address #2 is correct, in other words, if both basic programs stored from the boot addresses #1 and #2 are correct, the process proceeds to step S15 in which the CPU 32 compares the versions described in the basic programs stored from the boot addresses #1 and #2.

In step S16, based on the comparison result of step S15, the CPU 32 selects the boot address storing the newer version from the two correct basic programs stored from the boot addresses #1 and #2. More specifically, if the versions of the two correct basic programs in the boot addresses #1 and #2 are, for example, 1.0 and 1.1, respectively, the boot address #2 storing the 1.1-version basic program is selected. The process further proceeds to step S19.

If it is found in step S14 that the basic program stored from the boot address #2 contains an error, i.e., there is no basic program in the boot address #2 or the stored basic program is incorrect, the process proceeds to step S17 in which the CPU 32 selects the boot address #1 that stores the basic program free of error. The process then proceeds to step S19.

If it is determined in step S12 that the basic program stored from the boot address #1 contains an error, the process proceeds to step S18 in which the CPU 32 selects the boot address #2. The process further proceeds to step S19. That is, if the installing operation of the basic program from the boot address #1 has failed, i.e., if the basic program contains an error, there should be a correct basic program stored from the boot address #2. Accordingly, the boot address #2 is selected in step S18.

In step S19, the CPU 32 checks the code of the application program, which is stored after the basic program, stored from the boot address selected in one of steps 16, 17 and 18 (hereinafter sometimes referred to as the "selected boot address").

The CPU 32 then determines (detects) in step S20 whether the application program corresponding to the basic program stored from the selected boot address contains an error. If the outcome of step S20 is yes, i.e., the installation of the application program has failed, the process proceeds to step S21 in which the CPU 32 controls the modem 38 to instruct the transmitter 1 to retransmit the application program via the public network 7. After the CPU 32 has waited for the application program to be transmitted he transmitter 1 via the satellite 3 and stored in the temporary buffer 37 or to be transmitted via the public network 7 and received by the modem 38, the process proceeds to step S22. In step S22, the application program transmitted from the transmitter 1 is installed, and the process returns to step S11.

If it is determined in step S20 that there is no error in the application program, the process proceeds to step S23 in which the boot program that forms the boot portion of the basic program stored from the selected boot address is executed, thereby starting the apparatus in the normal condition. The processing is thus completed.

As discussed above, a determination is made of whether there is any error in the computer program stored from the boot address #1 or #2. If an error has been detected in the computer program, the boot address #1 or #2 corresponding to the computer program which does not contain an error is selected. If neither of the boot address #1 nor #2 contains an error, the boot address #1 or #2 storing the more recent version of the basic program is selected, and the program is then executed. With this arrangement, the apparatus can reliably be started in a normal condition, and if an old version and a new version of correct basic programs are stored, priority is given to execute the newer version of the program.

If there is an error contained in part of the computer program stored in the program memory 35 related to the processing executed in step S11, the CPU 32 is not operated in a normal condition, i.e., the CPU 32 runs away and is erroneously operated. The occurrence of an error in the CPU 32 is detected by the system monitor 33 based on the chip select signal CS or the timer out signal output from the CPU 32, as noted above.

Upon detecting that an error has occurred in the CPU 32, the system monitor 33 controls the reset circuit 34 to reset the CPU 32. Further, if the CPU 32 has inverted and output the MSB of the address before being reset, the system monitor 33 directly outputs the MSB of the address to the program memory 35. On the other hand, if the CPU 32 has directly output the MSB of the address without inverting it before being reset, the system monitor 33 inverts the MSB of the address and outputs it to the program memory 35.

During the booting operation, the CPU 32 sets, for example, OO . . . OH, at the address of the built-in program counter. Accordingly, if the MSB of the address from the CPU 32 is directly output, address 00 . . . OH, i.e., the boot address #1, is supplied to the program memory 35. Conversely, if the inverted MSB of the address from the CPU 32 is output, address 80 . . . OH, i.e., the boot address #2, is supplied to the program memory 35.

Figure 11:
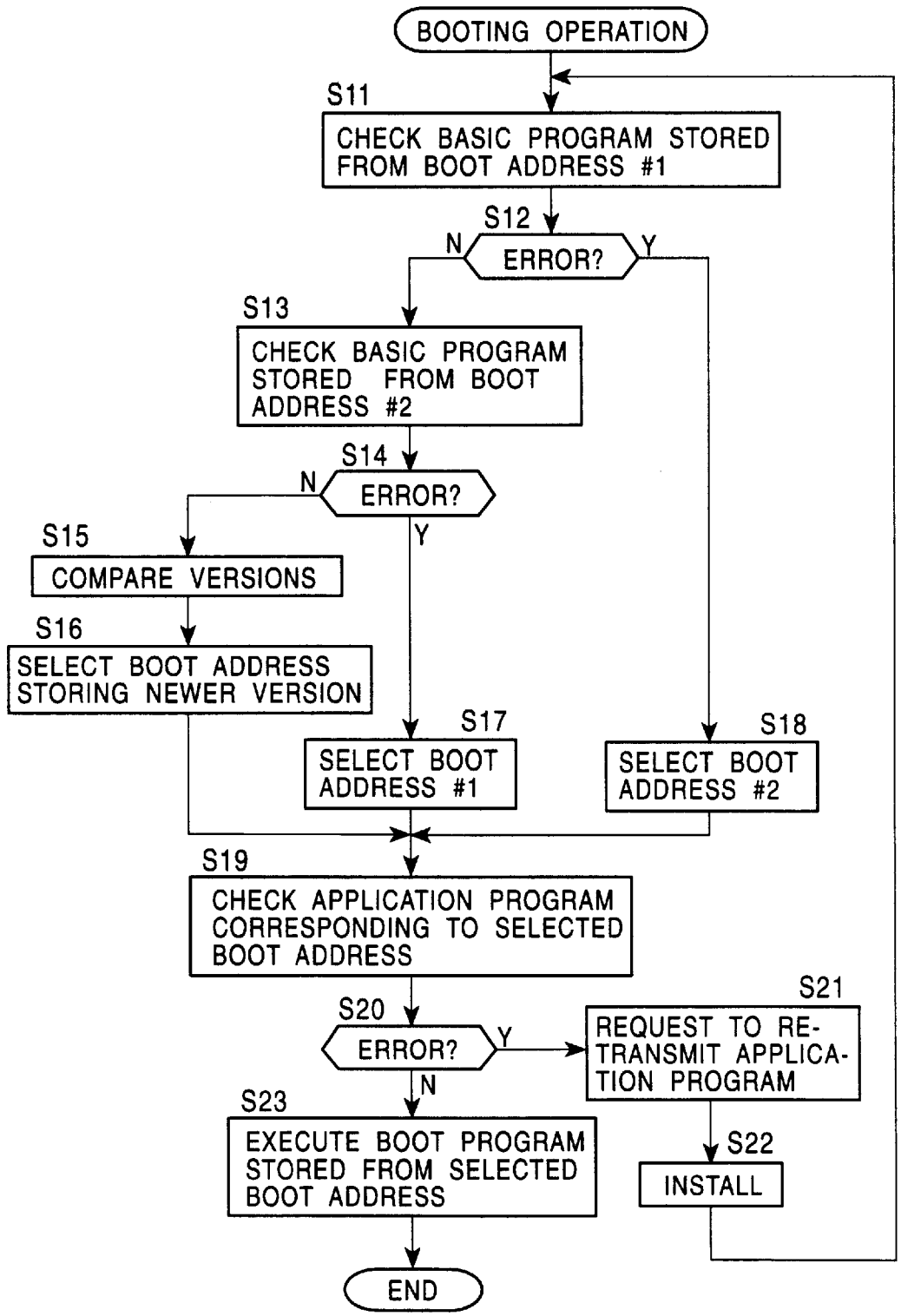
FIG. 11 is a flow chart illustrating the booting operation.

Therefore, if the CPU 32 runs away in step S11 of FIG. 11 by executing the computer program stored from the boot address #1, the CPU 32 is reset and then executes the computer program stored from the boot address #2. The booting operation shown in FIG. 11 is then performed. If the CPU 32 runs away by executing the computer program stored from the boot address #2 due to a failure of the subsequent installing operation, the CPU 32 is reset and then executes the computer program stored from the boot address #1. The booting operation shown in FIG. 11 is then performed.

It is therefore possible to start the apparatus in a normal condition as long as a correct basic program is stored in at least one of the boot addresses #1 and #2.

One of the computer programs stored from the respective boot addresses #1 and #2 is executed, and if an error occurs to the executed computer program, the computer program stored from the other boot address is executed. This obviates the need for storing one of the boot addresses #1 and #2 in a memory, such as a non-volatile memory, as the address to be selected during the booting operation.

In this embodiment, both basic program and application program are simultaneously transmitted from the transmitter 1 and are installed by the receiver 5 at the same time. However, only the basic program or the application program, or only the boot portion or the load portion may be installed.

The application of the present invention is not restricted to receivers for receiving digital satellite broadcasts, such as the one shown in FIG. 1, but is extended to all the types of apparatuses for loading and executing computer programs.

If there is no error in the computer program stored in the program memory 35 related to the processing executed in step Sll, the boot address #1 or #2 may be selected by the CPU 32 by controlling the address to be output, or may be selected by causing the system monitor 33 to control the MSB of the address to be output from the CPU 32.

The computer program run by the receiver 5 may be provided via a satellite line, the Internet, or another type of network. The computer program may also be provided by recording it on a floppy disk, a compact disc-read only memory (CD-ROM), or another type of recording medium.

Generally, application programs are dependent upon an OS, and may sometimes be operated only under a predetermined version of an OS. It is thus necessary to check whether an application program to be installed is compatible with the installed OS by using an installer. Then, only when it is confirmed that the application program is operable under the installed OS, i.e., the version of the application program a compatible with the OS, the application program is installed.

That is, for example, there is a version written in the application program. The installer refers to the version of the application program, thereby determining whether the application program matches (is compatible with) the OS.

It may be sometimes desired that the OS installed in the computer be overwritten by another version. If it is not checked, however, that the application program that has already been installed with the old version of the OS will be compatible with the new version of the OS, the result may be a failure in executing the application program, which ran successfully before overwriting the OS.

A method for overcoming the above drawback is described below with reference to FIGS. 12 through 14.

It is now assumed that the version-information addition circuit 11 shown in FIG. 2 writes the version of the basic program or the application program to be input into the addition circuit 11 and also writes the version of the application program or the basic program compatible with the corresponding program. The programs are then output to the MUX 12.

More specifically, for example, when the boot portion of a basic program is input into the version-information addition circuit 11, the version of the boot portion and the respective versions of the compatible load portion and the compatible application program are described. Upon the input of the load portion of a basic program, the version of the load portion, and the respective versions of the compatible boot portion and the compatible application program are written. Further, upon the input of an application program, the version of the application program and the respective versions of the compatible boot portion and the compatible load portion are described.

The information added to a computer program in the version-information addition circuit 11 will be hereinafter referred to as "version information".

In the information processing unit 25 shown in FIG. 4, the computer program extracted in the DMUX 22, as discussed above, is supplied to the temporary buffer 37 via the I/F 31 and stored. Simultaneously, the CPU 32 reads the load portion of the basic program stored in the program memory 35 and writes it into the RAM 36 and executes it. This makes it possible to download and install the computer program stored in the temporary buffer 37. It is now assumed that a certain version of the basic program and an application program operable under the basic program are already stored (installed) in the program memory 35.

Figure 12:
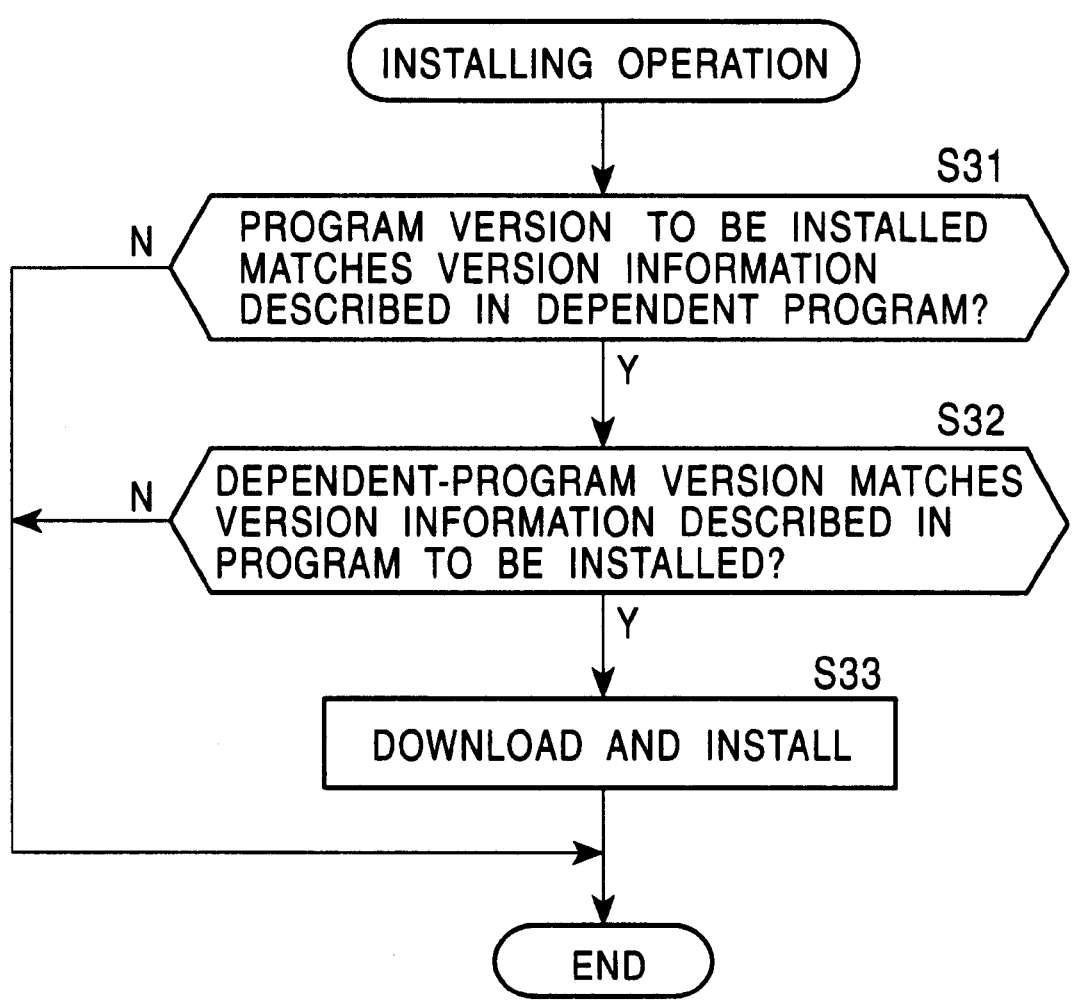
FIG. 12 is a flow chart illustrating the installing operation performed by the CPU shown in FIG. 4.

The details of the installing operation are shown in the flow chart of FIG. 12.

In the installing operation, it is first determined instep S31 whether the version of a computer program to be installed matches the version information written in another computer program dependent upon the computer program to be installed (the latter program will hereinafter be referred to as the "dependent program").

The boot portion and the load portion that form a basic program, and the application program, are dependent upon each other. Thus, if the boot portion is a computer program to be installed, the load portion and the application program are dependent programs. Alternatively, if the load portion is a computer program to be installed, the boot portion and the application program are dependent programs. If the application program is a computer program to be installed, the boot portion and the load portion are dependent programs.

If it is determined in step S31 that the version of the computer program to be installed matches the version information described in the dependent programs, the process proceeds to step S32. It is further checked in step S32 whether the versions of the dependent programs match the version information written in the computer program to be installed. If the result of step S32 is yes, i.e., if the version of the computer program to be installed and the versions of the dependent programs are compatible with(match) each other, the process proceeds to step S33. Instep S33, the computer program is downloaded from the temporary buffer 37 and installed into the program memory 35. The installing operation is thus completed.

In contrast, if it is found in step S31 that the version of the computer program to be installed is incompatible with the version information described in the dependent programs, or if it is determined in step 532 that the versions of the dependent programs are incompatible with the version information written in the computer program to be installed, the computer program is neither downloaded nor installed. The installing operation is thus completed (discontinued).

In step S33, immediately when the computer program is installed into the program memory 35, the computer program stored in the program memory 35 whose version is different from the version of the new program is basically deleted (for example, overwritten).

If only one of the boot portion, the load portion, and the application program is stored in the temporary buffer 37 as the computer program, the above-described installing operation is performed on such a single program. If more than one of the boot portion, the load portion, and the application program are stored in the temporary buffer 37 as the computer programs, the aforementioned installing operation is conducted on such plural programs.

The details of the installing operation are described below with reference to FIGS. 13 and 14.

Figure 13:
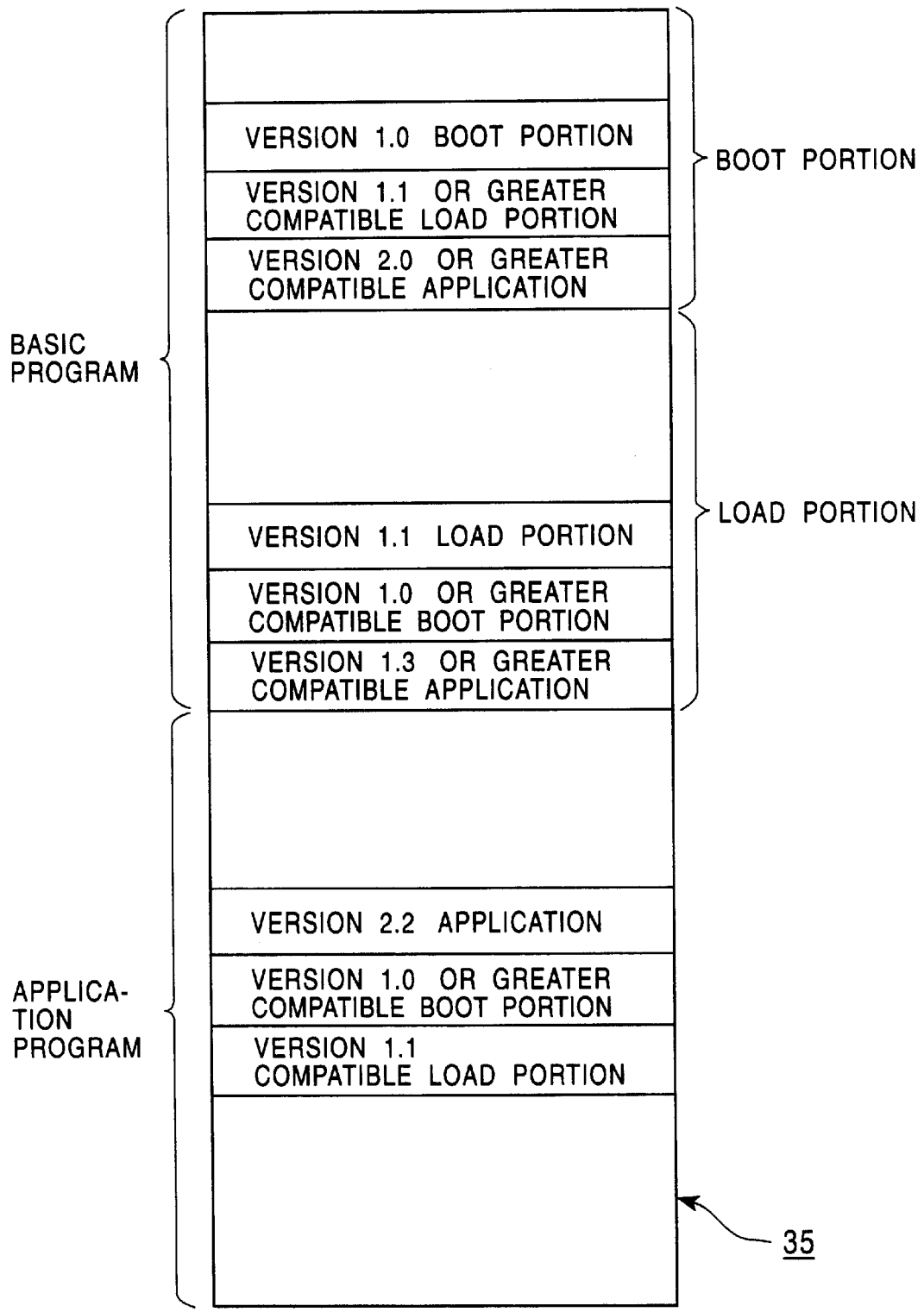
FIG. 13 illustrates the content stored in the program memory.

It is now assumed that the basic program (boot portion and load portion) and the application program shown in FIG. 13 are stored (installed) in the program memory 35.

In this embodiment, the version of the boot portion, and the versions of the load portion and the application program compatible with the boot portion are described at the end of the boot portion. The same applies to the load portion and the application program, i.e., version information is described at the end of each of the load portion and the application program.

In the embodiment shown in FIG. 13, the version of the boot portion is 1.0, and the versions of the compatible load portion and the compatible application program are 1.1 or greater and 2.0 or greater, respectively. The version of the load portion is 1.1, and the versions of the compatible boot portion and the compatible application program are 1.1 or greater and 1.3 or greater, respectively. Further, the version of the application program is 2.2, and the versions of the compatible boot portion and the compatible load portion are 1.0 or greater and 1.1, respectively.

Consequently, the 1.0-version boot portion is compatible with the load portion and the application program, both of which require the 1.0 or greater version of the boot portion The 1.1-version load portion is compatible with the boot portion and the application program which respectively require the 1.1 version of the load portion and the 1.1 or higher version of the load portion. Further, the 2.2-version application program is compatible with the boot portion and the load portion which respectively require the 2.0 or higher version of the application program and the 1.3 or higher version of the application program. With this arrangement, the boot portion, the load portion, and the application program installed in the program memory 35 are operated properly.

Figure 14A:
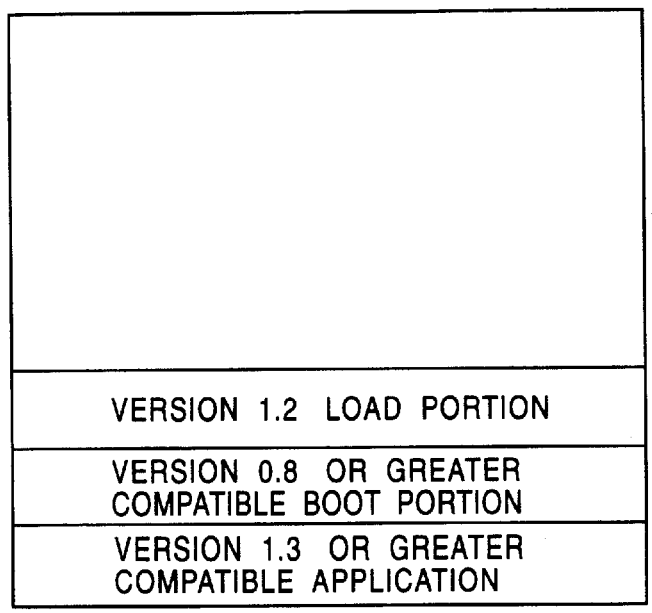
FIGS. 14A and 14B illustrate the content stored in the temporary buffer shown in FIG. 4.
Figure 14B:
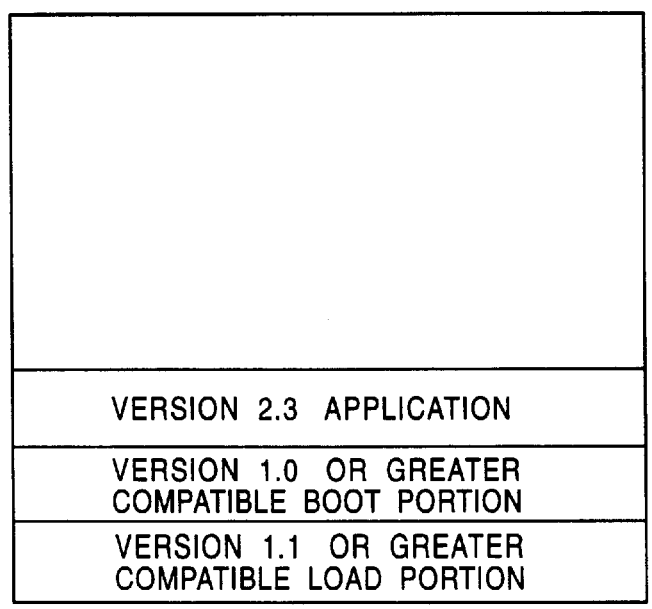

In the program memory 35 in which the boot portion, the load portion, and the application program are installed as described above, it is now assumed that the load portion shown in FIG. 14A and the application program shown in FIG. 14B are transmitted from the transmitter 1 and stored in the temporary buffer 37 of the receiver 5. In this case, the installing operation is sequentially performed on the load portion and the application program as computer programs to be installed.

More specifically, the load portion stored in the temporary buffer 37 is first regarded as a computer program to be installed, in which case, the boot portion stored in the program memory shown in FIG. 13 and the application program stored in the temporary buffer 37 shown in FIG. 14B are considered as dependent programs.

It is then determined whether the computer program and the dependent program are compatible with each other.

More specifically, the version of the load portion stored in the temporary buffer 37 shown in FIG. 14A is 1.2, and the versions of the compatible boot portion and the compatible application program are 0.8 or greater and 1.3 or greater, respectively. The versions of the boot portion stored in the program memory 35 shown in FIG. 13 and the application program stored in the temporary buffer 37 shown in FIG. 14B are 1.0 and 2.3, respectively. It is thus confirmed that the versions of both dependent programs are compatible with the load portion stored in the temporary buffer 37.

The version of the load portion compatible with the boot portion shown in FIG. 13, which serves as a dependent program, stored in the program memory 35 is 1.1 or higher. Accordingly, the 1.2 version load portion stored in the temporary buffer 37 shown in FIG. 14A is compatible with the boot portion stored in the program memory 35 shown in FIG. 13.

Similarly, the version of the load portion shown in FIG. 14B which is compatible with the application program, which serves as a dependent program, stored in the temporary buffer 37, is 1.1 or higher. Thus, the load portion stored in the temporary buffer 37 shown in FIG. 14A is compatible with the application program stored in the temporary buffer 37 shown in FIG. 14B.

It is thus verified that the load portion to be installed, and the boot portion and the application program, both of which serve as dependent program, are compatible with each other. Accordingly, the load portion stored in the temporary buffer 37 shown in FIG. 14A is transferred to the program memory 35 and is then installed.

It is now determined that the application program stored in the temporary buffer 37 shown in FIG. 14B will be installed as the computer program. In this case, the boot portion stored in the program memory 35 shown in FIG. 13 and the load portion installed as described above shown in FIG. 14A serve as dependent programs.

A determination is then made of whether the computer program to be installed and the dependent programs are compatible with each other.

More specifically, the version of the application program stored in the temporary buffer 37 is 2.3, and the versions of the compatible boot portion and the compatible load portion are 1.0 or higher and 1.1 or higher, respectively. The versions of the boot portion stored in the program memory 35 and the installed load portion, both of which serve as the dependent programs, are 1.0 and 1.2, respectively. It is therefore confirmed that both versions of the boot portion and the load portion are compatible with the application program stored in the temporary buffer 37.

The version of the application program compatible with the boot portion stored in the program memory 35 is 2.0 or higher. Accordingly, the 2.3-version application program stored in the temporary buffer 37 is compatible with the boot portion stored in the program memory 35.

Likewise, the version of the application program compatible with the installed load portion is 1.3 or higher. Accordingly, the 2.3-version application program stored in the temporary buffer 37 is compatible with the installed load portion.

It is thus verified that the application program as the computer program to be installed, and the boot portion and the load portion, both of which serve as the dependent programs, are compatible with each other. Consequently, the application program stored in the temporary buffer 37 is transferred into the program memory 35 and is then installed.

As discussed above, in downloading and installing a computer program, it is checked whether the computer program and its dependent program are compatible with each other. This makes it possible to prevent the downloading and the installation of a computer program that is not operating properly.

If the version of a computer program to be installed is incompatible with the version of a dependent program, or vice versa, it is possible to instruct the transmitter 1 to send a dependent program whose version is compatible with the computer program. Such an instruction may be sent by the modem 38 under the control of the CPU 32, in which case, the transmitter 1 may send the required computer program via the satellite 3 or the public network 7.

If the computer program is configured to be so-called "upper compatible", it is allowed to be installed only when the version of the computer program is higher than that already stored in the program memory 35. In this case, it is only necessary to write the version of the computer program and unnecessary to write the version of a compatible dependent program.

As is seen from the foregoing description, the present invention offers the following advantages.

A boot program, which is a computer program for performing a booting operation, is selected in the following manner. It is first determined whether computer programs starting from a first address and a second address of a storage unit contain an error. Based on this determination, the computer program stored from the first address or the second address is executed. This makes it possible to start an apparatus even if the installation of the boot program into the first address or the second address fails.

Additionally, the version of a second computer program and the version of a first computer program compatible with the second computer program are both described in the second computer program. Also, the version of the second computer program dependent upon the first computer program and the version of the first computer program compatible with the second computer program are both described in the second computer program. It is thus possible to check the compatibility between the first computer program and the second computer program.

It is then determined whether the version of the second computer program compatible with the first computer program is compatible with the version of the first computer program. A determination is also made of whether the version of the first computer program is compatible with the version of the second computer program. Based on the above determinations, the second computer program is installed. It is thus possible to prevent the downloading and the installation of the second computer program which is incompatible with the first computer program.

What is claimed is:

1. An information processing apparatus for providing a second computer program dependent upon a first computer program, said apparatus comprising:

a processor operable to describe in said second computer program a version of said second computer program and a version of said first computer program compatible with said second computer program; and a multiplexer operable to multiplex program data using said first and second computer programs to produce a multiplexed output for modulating a broadcast carrier signal.

2. A method for providing a second computer program dependent upon a first computer program, comprising:

describing in said second computer program a version of said second computer program and a version of said first computer program compatible with said second computer program; and multiplexing program data using said first and second computer programs to produce a multiplexed output for modulating a broadcast carrier signal.

3. A computer-readable medium having stored thereon a second computer program dependent upon a first computer program, said second computer program including a data structure stored on said medium, said data structure comprising:

version information including a version of said second computer program and a version of said first computer program compatible with said second computer program, wherein said first and second computer programs are for multiplexing program data to produce a multiplexed signal to modulate a broadcast carrier signal.

4. An information processing apparatus for installing a second computer program dependent upon a first computer program, said apparatus comprising:

a receiver operable to receive a broadcast signal produced by multiplexing program data using said first and second computer programs to produce a multiplexed output for modulating said broadcast signal;

a demodulator operable to extract said first and second computer programs from said broadcast signal;

a determination unit operable to make a determination of whether a version of said second computer program is compatible with a version of said first computer program, and to make a determination of whether said version of said first computer program is compatible with said version of said second computer program; and an installation unit operable to install said second computer program based on said determinations.

5. An information processing apparatus according to claim 4, wherein, when said version of said first computer program and said version of said second computer program compatible with said first computer program are described in said first computer program, and said version of said second computer program and said version of said first computer program compatible with said second computer program are described in said second computer program, said determination unit makes said determinations based on said versions described in said first computer program and said second computer program.

6. An information processing apparatus according to claim 4, further comprising an instruction unit, wherein, when said first computer program and said second computer program are provided from a predetermined providing apparatus, and said version of said second computer program is incompatible with said version of said first computer program, or said version of said first computer program is incompatible with said version of said second computer program, said instruction unit instructs said predetermined providing apparatus to transmit said first computer program whose version is compatible with said second computer program.

7. A method for installing a second computer program dependent upon a first computer program, comprising:

receiving a broadcast signal produced by multiplexing program data using said first and second computer programs to produce a multiplexed output for modulating said broadcast signal;

extracting said first and second computer programs from said broadcast signal;

making a determination of whether a version of said second computer program is compatible with a version of said first computer program, and a determination of whether said version of said first computer program is compatible with a said version of said second computer program; and installing said second computer program based on said determinations.

* * * * *